(12) United States Patent
Li et al.

(10) Patent No.: US 8,571,850 B2
(45) Date of Patent: Oct. 29, 2013

(54) DUAL CROSS-MEDIA RELEVANCE MODEL FOR IMAGE ANNOTATION

(75) Inventors: Mingjing Li, Beijing (CN); Jing Lui, Beijing (CN); Bin Wang, Beijing (CN); Zhiwei Li, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1371 days.

(21) Appl. No.: 11/956,331

(22) Filed: Dec. 13, 2007

(65) Prior Publication Data

US 2009/0076800 A1 Mar. 19, 2009

Related U.S. Application Data

(60) Provisional application No. 60/972,175, filed on Sep. 13, 2007.

(51) Int. Cl.
 *G06F 17/27* (2006.01)
(52) U.S. Cl.
 USPC ............... 704/9; 382/224; 382/228; 707/769
(58) Field of Classification Search
 USPC .................................................. 707/999.003
 See application file for complete search history.

(56) References Cited

U.S. PATENT DOCUMENTS

| | | | |
|---|---|---|---|
| 5,630,121 A | 5/1997 | Braden-Harder et al. | |
| 5,680,636 A | 10/1997 | Levine et al. | |
| 5,852,823 A | 12/1998 | De Bonet | |
| 5,987,457 A | 11/1999 | Ballard | |
| 6,272,484 B1 | 8/2001 | Martin et al. | |
| 6,397,181 B1 | 5/2002 | Li et al. | |
| 6,415,282 B1 | 7/2002 | Mukherjea et al. | |
| 6,687,416 B2 | 2/2004 | Wang | |
| 6,850,644 B1 | 2/2005 | Shin et al. | |
| 6,970,860 B1 | 11/2005 | Liu et al. | |
| 7,028,253 B1 | 4/2006 | Lieberman et al. | |
| 7,043,094 B2 | 5/2006 | Thomas et al. | |
| 7,099,860 B1 | 8/2006 | Liu et al. | |
| 7,162,691 B1 | 1/2007 | Chatterjee et al. | |

(Continued)

FOREIGN PATENT DOCUMENTS

WO WO02099697 A1 12/2002

OTHER PUBLICATIONS

Shi Rui et al., "A Novel Approach to Auto Image Annotation Based on Pair-wise Constrained Clustering and Semi-naive Bayesian Model", 2005, IEEE, p. 1-6.*

(Continued)

*Primary Examiner* — Douglas Godbold
*Assistant Examiner* — Mark Villena
(74) *Attorney, Agent, or Firm* — Lee & Hayes, PLLC

(57) ABSTRACT

A dual cross-media relevance model (DCMRM) is used for automatic image annotation. In contrast to the traditional relevance models which calculate the joint probability of words and images over a training image database, the DCMRM model estimates the joint probability by calculating the expectation over words in a predefined lexicon. The DCMRM model may be advantageous because a predefined lexicon potentially has better behavior than a training image database. The DCMRM model also takes advantage of content-based techniques and image search techniques to define the word-to-image and word-to-word relations involved in image annotation. Both relations can be estimated by using image search techniques on the web data as well as available training data.

20 Claims, 6 Drawing Sheets

(56) References Cited

U.S. PATENT DOCUMENTS

| | | | |
|---|---|---|---|
| 7,209,815 B2 | 4/2007 | Grier et al. | |
| 7,231,381 B2 | 6/2007 | Li et al. | |
| 7,234,106 B2 | 6/2007 | Simske | |
| 7,283,992 B2 | 10/2007 | Liu et al. | |
| 2003/0110181 A1 | 6/2003 | Schuetze et al. | |
| 2003/0123737 A1 | 7/2003 | Mojsilovic et al. | |
| 2004/0049734 A1 | 3/2004 | Simske | |
| 2004/0205545 A1 | 10/2004 | Bargeron et al. | |
| 2004/0225686 A1 | 11/2004 | Li et al. | |
| 2004/0267733 A1 | 12/2004 | Kim | |
| 2005/0004910 A1 | 1/2005 | Trepess | |
| 2005/0055344 A1 | 3/2005 | Liu et al. | |
| 2005/0071365 A1 | 3/2005 | Hou et al. | |
| 2005/0131951 A1* | 6/2005 | Zhang et al. | 707/104.1 |
| 2005/0165763 A1* | 7/2005 | Li et al. | 707/3 |
| 2005/0228825 A1 | 10/2005 | Yang | |
| 2005/0235272 A1 | 10/2005 | Skinner | |
| 2006/0020597 A1 | 1/2006 | Keating et al. | |
| 2006/0041564 A1 | 2/2006 | Jain et al. | |
| 2006/0061595 A1 | 3/2006 | Goede et al. | |
| 2006/0155684 A1 | 7/2006 | Liu et al. | |
| 2006/0161520 A1 | 7/2006 | Brewer et al. | |
| 2006/0173909 A1 | 8/2006 | Carlson et al. | |
| 2006/0195858 A1 | 8/2006 | Takahashi et al. | |
| 2006/0206475 A1 | 9/2006 | Naam et al. | |
| 2007/0005571 A1 | 1/2007 | Brewer et al. | |
| 2007/0052734 A1 | 3/2007 | Skinner et al. | |
| 2007/0067345 A1 | 3/2007 | Li et al. | |
| 2007/0133947 A1 | 6/2007 | Armitage et al. | |
| 2007/0174269 A1 | 7/2007 | Jing et al. | |
| 2007/0174320 A1 | 7/2007 | Chou | |
| 2007/0214114 A1 | 9/2007 | Liu et al. | |
| 2007/0239778 A1 | 10/2007 | Gallagher | |
| 2007/0276820 A1 | 11/2007 | Iqbal | |
| 2008/0071744 A1 | 3/2008 | Yom-Tov | |
| 2008/0267503 A1 | 10/2008 | Denoue et al. | |
| 2009/0094234 A1 | 4/2009 | Marvit et al. | |
| 2010/0114888 A1 | 5/2010 | van Zwol et al. | |
| 2010/0114908 A1 | 5/2010 | Chand et al. | |

OTHER PUBLICATIONS

Zhigang Hua et al., "Semantic Knowledge Extraction and Annotation for Web Images", Nov. 6-11, 2005, ACM, pp. 467-470.*

Jin, Rong, Joyce Y. Chai, and Luo Si. "Effective automatic image annotation via a coherent language model and active learning." Proceedings of the 12th annual ACM international conference on Multimedia. ACM, 2004.*

Barnard, et al., "Matching Words and Pictures", retrieved at <<http://jmlr.csail.mit.edu/papers/volume3/barnard03a/barnard03a.pdf>>, Journal of Machine Learning Research, 2003, pp. 1107-1135.

Cascia, et al., "Combining Textual and Visual Cues for Content-based Image Retrieval on the World Wide Web", retrieved at <<http://www.cs.bu.edu/techreports/pdf/1998-004-combining-text-and-vis-cues.pdf>>, IEEE, BU CS TR98-004, Jun. 1998, 5 pgs.

Flickner, et al., "Query by Image and Video Content: The QBIC System", at <<http://www.cs.virginia.edu/~son/cs662.s06/QBIC.pdf>>, IEEE, Sep. 1995, pp. 23-32.

Guo, et al., "Enhanced Max Margin Learning on Multimodal Data Mining in a Multimedia Database", retrieved at <<http://delivery.acm.org/10.1145/1290000/1281231/p340-guo.pdf?key1=1281231&key2=0098944911&coll=GUIDE&dl=&CFID=15151515&CFTOKEN=6184618>>, ACM, KDD'07, Aug. 12-15, 2007, pp. 340-349.

Inoue, "On the Need for Annotation-Based Image Retrieval", available at least as early as Nov 7, 2007, at <<http://research.nii.ac.jp/~m-inoue/paper/inoue04irix.pdf>>, National Institute of Informatics, Tokyo, Japan, 3 pgs.

Jeon, et al., "Automatic Image Annotation and Retrieval using Cross-Media Relevance Models", at <<http://ciir.cs.umass.edu/pubfiles/mm-41.pdf>>, ACM, SIGIR'03, Jul. 28-Aug. 1, 2003, 8 pgs.

Jin, et al., "Effective Automatic Image Annotation via a Coherent Language Model and Active Learning", available at least as early as Jun. 12, 2007, at <<http://delivery.acm.org/10.1145/1030000/1027732/p892-jin.pdf?key1=1027732&key2=2189361811&coll=GUIDE&dl=GUIDE&CFID=21118987&CFTOKEN=73358540>>, ACM, MM'04, Oct. 10-16, 2004, pp. 892-899.

Kang, et al., "Regularizing Translation Models for Better Automatic Image Annotation", available at least as early as Jun. 12, 2007, at <<http://delivery.acm.org/10.1145/1040000/1031242/p350-kang.pdf?key1=1031242&key2=0070461811&coll=GUIDE&dl=GUIDE&CFID=21120579&CFTOKEN=59010486>>, ACM, CIKM'04, Nov. 8-13, 2004, pp. 350-359.

Li, et al., "Image Annotation by Large-Scale Content-based Image Retrieval", at <<http://delivery.acm.org/10.1145/1190000/1180764/p607-li.pdf?key1=1180764&key2=0704643811&coll=GUIDE&dl=GUIDE&CFID=22942426&CFTOKEN=26272205>>, ACM, MM'06, Oct. 23-27, 2006, pp. 607-610.

Li, et al., "Statistical Correlation Analysis in Image Retrieval", available at least as early as Jul. 4, 2007, at <<http://research.microsoft.com/~zhengc/papers/PR02li.pdf, 12 pgs.

Liu, et al., "An Adaptive Graph Model for Automatic Image Annotation", available at least as early as Jun. 12, 2007, at <<http://delivery.acm.org/10.1145/1180000/1178689/p61-liu.pdf?key1=1178689&key2=6322461811&coll=GUIDE&dl=GUIDE&CFID=21123267&CFTOKEN=91967441>>, ACM, MIR'06, Oct. 26-27, 2006, pp. 61-69.

Saber, et al., "Automatic Image Annotation Using Adaptive Color Classification", at <<http://www.rit.edu/~esseee/docs/15.pdf>>, Graphical Models and Image Processing, vol. 58, No. 2, Mar. 1996, pp. 115-126.

Saykol, et al., "A Semi Automatic Object Extraction Tool for Querying in Multimedia Databases", available at least as early as Nov. 14, 2007, at <<http://www.cs.bilkent.edu.tri/~bilmdg/papers/mis01.pdf>>, pp. 10.

Suh, et al., "Semi-Automatic Image Annotation Using Event and Torso Identification", available at least as early as Nov. 14, 2007, <<at http://hcil.cs.umd.edu/trs/2004-15/2004-15.pdf>>, pp. 4.

Wang, et al., "Automatic Image Annotation and Retrieval Using Subspace Clustering Algorithm", available at least as early as Jun. 12, 2007, at <<http://delivery.acm.org/10.1145/1040000/1032621/p100-wang.pdf?key1=1032621&key2=2890461811&coll=GUIDE&dl=GUIDE&CFID=21121103&CFTOKEN=32821806>>, ACM, MMDB'04, Nov. 13, 2004, pp. 100-108.

Wang, et al., "Automatic Image Annotation and Retrieval Using Weighted Feature Selection", available at least as early as Jun. 12, 2007, at <<http://www.utdallas.edu/~lkhan/papers/MTA1.pdf>>, 17 pgs.

PCT Search Report dated Feb. 25, 2009, from corresponding PCT Application No. PCT/US2008/076274 field Sep. 12, 2008, 3 pages.

Office Action for U.S. Appl. No. 11/956,333, mailed on Jul. 27, 2011, Jing Liu, "Estimating Word Correlations from Images", 8 pgs.

Office Action for U.S. Appl. No. 11/956,333, mailed on Nov. 18, 2011, Jing Liu, "Estimating Word Correlations from Images", 8 pgs.

Riaz et al., "Efficient Image Retrieval Using Adaptive Segmentation of HSV Color Space" International conference on Computational Sciences and Its Applications, Jun. and Jul. 2008, 6 pages.

Zhu et al., "New Query Refinement and Semantics Integrated Image Retrieval System with Semiautomatic Annotation Scheme", Journal of Electronic Imaging, vol. 10(4), Oct. 2001, 11 pages.

Office action for U.S. Appl. No. 11/956,333, mailed on May 14, 2012, Liu et al., "Estimating Word Correlations from Images", 8 pages.

Non-Final Office Action for U.S. Appl. No. 12/369,421, mailed on Feb. 16, 2012, Linjun Yang et al., "Visual and Textual Query Suggestion", 23 pages.

Baeza-Yates et al., "Query Recommendation using Query Logs in Search Engines", retrieved on Dec. 31, 2008 at <<http://www.dcc.uchile.cl/~churtado/clustwebLNCS.pdf>>, EDBT 2004 Workshops, vol. 3268, Nov. 2004, 10 pages.

Beeferman, et al., "Agglomerative Clustering of a Search Engine Query Log", retrieved on Dec. 31, 2008 at <<http://www.dougb.com/

(56) References Cited

OTHER PUBLICATIONS papers/kdd.pdf>>, KDD 2000 Proc 6th ACM SIGKDD Intl Conf on Knowledge Dliscovery and Data Mining, Aug. 2000, 10 pgs.
Boyd, et al., "Convex Optimization", Book, Cambridge University Press, Mar. 2004, 730 pages.
Burstein, "Building an IE8 Visual Search Suggestion Provider for my Twitter Friends", retrieved on Jan. 2, 2009 at <<http://blogs.microsoft.co.il/blogs/bursteg/archive/2008/12/17/building-an-ie8-visual-search-suggestion-provider-for-my-twitter-friends.aspx>>, Dec. 2008, 13 pgs.
Carpineto, et al., "An Information Theoretic Approach to Automatic Query Expansion", ACM Transactions on Information Systems, vol. 19, Issue 1, Jan. 2001, 35 pages.
Crum, "Yahoo Suggestions for Image Search", retrieved on Jan. 2, 2009 at <<http://www.webpronews.com/topnews/2008/12/03/yahoo-suggestions-for-image-search, Dec. 3. 2008, pp. 1-4.
Datta, et al., "Image Retrieval: Ideas, Influences, and Trends of the New Age", retrieved on Dec. 31, 2008 at <<http://infolab.stanford.edu/~wangz/project/imsearch/review/JOUR/datta.pdf>>, ACM Computing Surveys, vol. 40, No. 2, Article 5, Publication date : Apr. 2008, 60 pages.
"Flickr", retrieved on Jan. 2, 2009 at <<http://www.flickr.com/>>, 1 pg.
Frey, et al., "Clustering by Passing Messages Between Data Points", retrieved on Dec. 31, 2008 at <<http://www.psi.toronto.edu/affinitypropagation/FreyDueckScience07.pdf, Science Magazine, vol. 315, Feb. 16, 2007, 23 pages.
"Google Image Search", retrieved on Jan. 2, 2009 at <<http://images.google.com/>>, Google, 2008, 1 pg.
He, et al., "Learning an Image Manifold for Retrieval", retrieved on Dec. 31, 2008 at <<http://delivery.acm.org/10.1145/1030000/1027532/p17-he.pdf?key1=1027532&key2=4414980321&coll=GUIDE&dl=GUIDE&CFID=16377253&CFTOKEN=92469850>>, MM Oct. 10-16, 2004, New York, USA, pp. 17-23.
"How Do You Create Search Features for Internet Explorer 8 Beta 2?", retrieved on Jan. 2, 2009 at <<http://www.code-magazine.com/article.aspx?quickid=0811072&page=2>>, CoDe Magazine, 2008, vol. 5, Issue 3, 1E8, 9 pages.
Huang, et al., "Spatial Color Indexing and Applications", retrieved on Dec. 31, 2008 at <<http://ieeexplore.ieee.org/stamp/stamp.jsp?arnumber=710779&isnumber=15374>>, 6th Intl Conf on Computer Vision, Jan. 1998, pp. 602-607.
Jia, et al., "Finding Image Exemplars Using Fast Sparse Affinity Propogation", retrieved on Dec. 30, 2008 at <<http://delivery.acm.org/10.1145/1460000/1459448/p639-jia.pdf?key1=1459448&key2=6654980321&coll=GUIDE&dl=GUIDE&CFID=16934217&CFTOKEN=19327438>>, MM Oct. 26-31, 2008, Vancouver, BC, Canada, pp. 639-642.
Lam-Adesina, et al., "Applying Summarization Techniques for Term Selection in Relevance Feedback", ACM, New York, New York, Annual ACM Conference on Research and Development in Information Retrieval, Proceedings of the 24th annual international ACM SIGIR conference on Research and development in information retrieval, Sep. 2001, pp. 1-9.
Lew, et al., "Content-based Multimedia Information Retrieval: State of the Art and Challenges", retrieved on Dec. 31, 2008 at <<http://www.liacs.nl/home/mlew/mir.survey16b.pdf>>, ACM Transactions on Multimedia Computing, Communications, and Applications, Feb. 2006, 26 pgs.
"Live Image Search", retrieved on Jan. 2, 2009 at <<http://image.live.com>>, Microsoft Corp., 2009, 1 pg.
Office Action for U.S. Appl. No. 11/956,333, mailed on Jan. 30, 2012, Jing Liu, "Estimating Word Correlations from Images", 7 pgs.
Final Office Action for U.S. Appl. No. 12/369,421, mailed on Sep. 15, 2011, Linjun Yang, "Visual and Textual Query Suggestion", 21 pages.
Sigurbjornsson, et al., "Flickr Tag Recommendation based on Collective Knowledge", retrieved on Dec. 31, 2008 at <<http://www2008.org/papers/pdf/p327-sigurbjornssonA.pdf>>, WWW Apr. 21-25, 2008, Beijing, China, pp. 327-336.
Smeulders, et al., "Content-Based Image Retrieval at the End of the Early Years", retrieved on Dec. 31, 2008 at <<http://ieeexplore.ieee.org/stamp/stamp.jsp?arnumber=00895972>>, IEEE Transactions on Pattern Analysis and Machine Intellegence, vol. 22, No. 12, Dec. 2000, pp. 1349-1380.
Snoek, et al., "MediaMill: Video Search Using a Thesaurus of 500 Machine Learned Concepts", retrieved on Dec. 31, 2008 at <<http://staff.science.uva.n1/~cgmsnoek/pub/snoek-demo-samt2006.pdf>>, Proc 1st Intl Conf on Semantic and Digital Media Technologies, Dec. 2006, pp. 1-2.
Swets, et al., "Using Discriminant Eigenfeatures for Image Retrieval", IEEE Transactions on Pattern Analysis and Machine Intelligence, vol. 18, Aug. 1996, pp. 831-836, 6 pgs.
Weinberger, et al., "Resolving Tag Ambiguity", retrieved on Dec. 31, 2008 at <<http://research.yahoo.com/files/ctfp6043-weinberger.pdf>>, MM Oct. 26-31, 2008, Vancouver, BC, Canada, 9 pages.
Wen, et al., "Clustering User Queries of a Search Engine", retrieved on Dec. 31, 2008 at <<https://research.microsoft.com/en-us/um/people/jrwen/jrwen_files/publications/QC-WWW10.pdf>>, WWW10, May 1-5, 2001, Hong Kong, pp. 162-168.
Worring, et al., "The MediaMill Large-lexicon Concept Suggestion Engine", retrieved on Dec. 31, 2008 at <<http://staff.science.uva.nl/~cgmsnoek/pub/worring-demo-acm2006.pdf>>, MM Oct. 23-27, 2006, Santa Barbara, CA., 2 pages.
"XML Search Suggestions Format Specification", retrieved on Jan. 2, 2009 at <<http://msdn.microsoft.com/en-us/library/cc848863(VS.85).aspx>>, Microsoft Corporation 2009, 6 pages.
Xu, et al., "Query Expansion Using Local and Global Document Analysis", retrieved on Dec. 31, 2008 at <<http://citeseerx.ist.psu.edu/viewdoc/download?doi=10.1.1.49.3174&rep=rep1&type=pdf>>, Proc 19th Annual Intl ACM SIGIR Conf on Reseach and Development in Information Retrieval, Aug. 1996, 8 pages.
Xue, et al., "Improving Web Search Using Image Snippets", retrieved on Dec. 31, 2008 at <<http://cs.nju.edu.cn/zhouzh/zhouzh.files/publication/toit08.pdf>>, ACM Transactions on Internet Technology, vol. 8, Issue 4, Sep. 2008, 27 pages.
"Yahoo! Image Search", retrieved on Jan. 2, 2009 at <<http://images.search.yahoo.com/>>, Yahoo! 2008, 1pg.
Yu, et al., "Improving Pseudo-Relevance Feedback in Web Information Retrieval Using Web Page Segmentation", retrieved on Dec. 31, 2008 at <<http://www2003.org/cdrom/papers/refereed/p300/p300-Yu.html>>, WWW2003, May 20-24, 2003, Budapest, Hungary, 13 pages.
Zhou, et al., "Ranking on Data Manifolds", retrieved on Dec. 31, 2008 at <<http://www.kyb.mpg.de/publications/pdfs/pdf2334.pdf>>, Max Planck Institute for Biological Cybernetics, Germany, Technical Report No. TR-113, Jun. 2003, 8 pages.

\* cited by examiner

FOR EACH WORD OF A LEXICON, OBTAIN A WORD-TO-WORD CORRELATION BETWEEN THE WORD AND A CANDIDATE WORD, AND OBTAIN A WORD-TO-IMAGE CORRELATION BETWEEN THE WORD AND A TARGET IMAGE
110

↓

DETERMINE VALUE OF A COLLECTIVE WORD-TO-IMAGE CORRELATION BETWEEN THE CANDIDATE WORD AND THE TARGET IMAGE BASED ON THE WORD-TO-WORD CORRELATIONS BETWEEN THE CANDIDATE WORD AND EACH WORD IN THE LEXICON, AND THE WORD-TO-IMAGE CORRELATIONS BETWEEN EACH WORD IN THE LEXICON AND THE TARGET IMAGE
120

↓

ANNOTATE THE TARGET IMAGE USING THE CANDIDATE WORD IF THE COLLECTIVE WORD-TO-IMAGE CORRELATION BETWEEN THE CANDIDATE WORD AND THE TARGET IMAGE SATISFIES A PRESET CONDITION
130

Fig. 1

DUAL CROSS-MEDIA RELEVANCE MODEL FOR IMAGE ANNOTATION

PRIORITY AND RELATED APPLICATIONS

This patent application claims priority to U.S. provisional patent application Ser. No. 60/972,175, entitled "Dual Cross-Media Relevance Model for Image Annotation" filed on Sep. 13, 2007. This patent application is also related to the commonly-owned U.S. patent application Ser. No. 11/956,333, entitled "Estimating Word Correlations from Images", filed on Dec. 13, 2007 with the present patent application, which US patent application is hereby incorporated by reference.

BACKGROUND

With the advent of digital imagery, the number of digital images has been growing rapidly and there is an increasing requirement to index and search these images effectively. Systems using non-textual (image) queries have been proposed but many users found it hard to represent their queries using abstract image features. Most users prefer textual queries, i.e. keyword-based image search, which is typically achieved by manually providing image annotations and allowing searches over these annotations using a textual query. However, manual annotation is an expensive and tedious procedure, making automatic image annotation necessary for efficient image retrieval.

Image annotation has been an active research topic in recent years due to its potential impact on both image understanding and web image retrieval. Existing relevance-model-based methods perform image annotation by maximizing the joint probability of images and words, which is calculated as an expectation projected over training images. However, the semantic gap and the dependence on training data restrict their performance and scalability.

Many algorithms have been proposed for automatic image annotation. In a straightforward way, each semantic keyword or concept is treated as an independent class and corresponds to one classifier. Methods like linguistic indexing of pictures, image annotation using support vector machine (SVM) and Bayes point machine fall into this category. Some other methods try to learn a relevance model associating images and keywords. The early work applied a machine translation model to translate a set of blob tokens (obtained by clustering image regions) to a set of keywords.

Other work introduced the Cross-Media Relevance Model (CMRM), which uses the keywords shared by the similar images to annotate new images. The CMRM has been subsequently improved by the continuous-space relevance model (CRM) and the multiple Bernoulli relevance model (MBRM). Recently, there are some efforts to consider the word correlation in the annotation process, such as Coherent Language Model (CLM), Correlated Label Propagation (CLP), and WordNet-based method (WNM).

All above-discussed methods suffer from two problems. One is their dependence on the training dataset to learn the models. In practice, it is very difficult to get a well-annotated set, and their scalability is doomed. The other is the well-known semantic gap. With traditional simple associations between images (visual content features) and words, the degradation of annotation performance is unavoidable.

The web prosperity brings a huge deposit of almost all kinds of data and provides solutions to many problems that used to seem unsolvable. In recent years, some researchers began to leverage web-scale data for image annotation. An example of such work was proposed by Wang et al. (Wang, X., Zhang, L., Jing, F., Ma, W. Y. AnnoSearch: Image Auto-Annotation by Search. International Conference on Computer Vision and Pattern Recognition, New York, USA, June, 2006.) In that work, at least one accurate keyword is required by the text-based image searcher to find a set of semantically similar images. Content-based image search in the obtained image set is then performed to retrieve visually similar images. Annotations are then mined from the text descriptions (title, URLs and surrounding texts) of the retrieved images, which are similar on semantics and visual content. However, the initial accurate keyword for each image is a cumbersome requirement in practice. Moreover, the method needs to perform the content-based search on a well built image set, which is not easy to construct and not readily accessible. Additionally, there is currently no ideal content-based search engine available. The method proposed in that article thus has only limited use for the web image annotation.

For the foregoing reasons, further improvement on methods for image annotation is desirable, particularly in the Web search-related context.

SUMMARY

In this disclosure, a dual cross-media relevance model (DCMRM) is proposed for automatic image annotation. In contrast to the traditional relevance models which estimate the joint distribution of words and images by calculating the expectation over a training image database, the present model estimates the joint probability by calculating the expectation over words in a predefined lexicon.

The DCMRM model annotates images by maximizing the joint probability of images and words. In one embodiment, the disclosed DCMRM model obtains word-to-word correlations between a candidate word and each word in the lexicon, and word-to-image correlations between each word and a target image being annotated. Based on word-to-word correlations and the word-to-image correlations, the model further determines the value of a collective word-to-image correlation between the candidate word and the target image, and then annotates the target image using the candidate word if the collective word-to-image correlation between the candidate word and the target image satisfies a preset condition.

One aspect of DCMRM takes advantage of image search engines to provide good search results. The present disclosure introduces a set of search-based schemes to estimate both word-to-image relations and word-to-word relations in DCMRM. The schemes calculate the probability of an image given a certain keyword by exploring keyword-based image retrieval, in which the top-ranked images obtained by an image search engine are considered. The schemes may also calculate several different types of search-based word-to-word correlations in the web context and combine them in a linear form.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

FIG. 1 shows a flow chart of an exemplary method for image annotation according to the disclosed Dual Cross-Media Relevance Model (DCMRM).

DETAILED DESCRIPTION

An Overview

Figure 2:
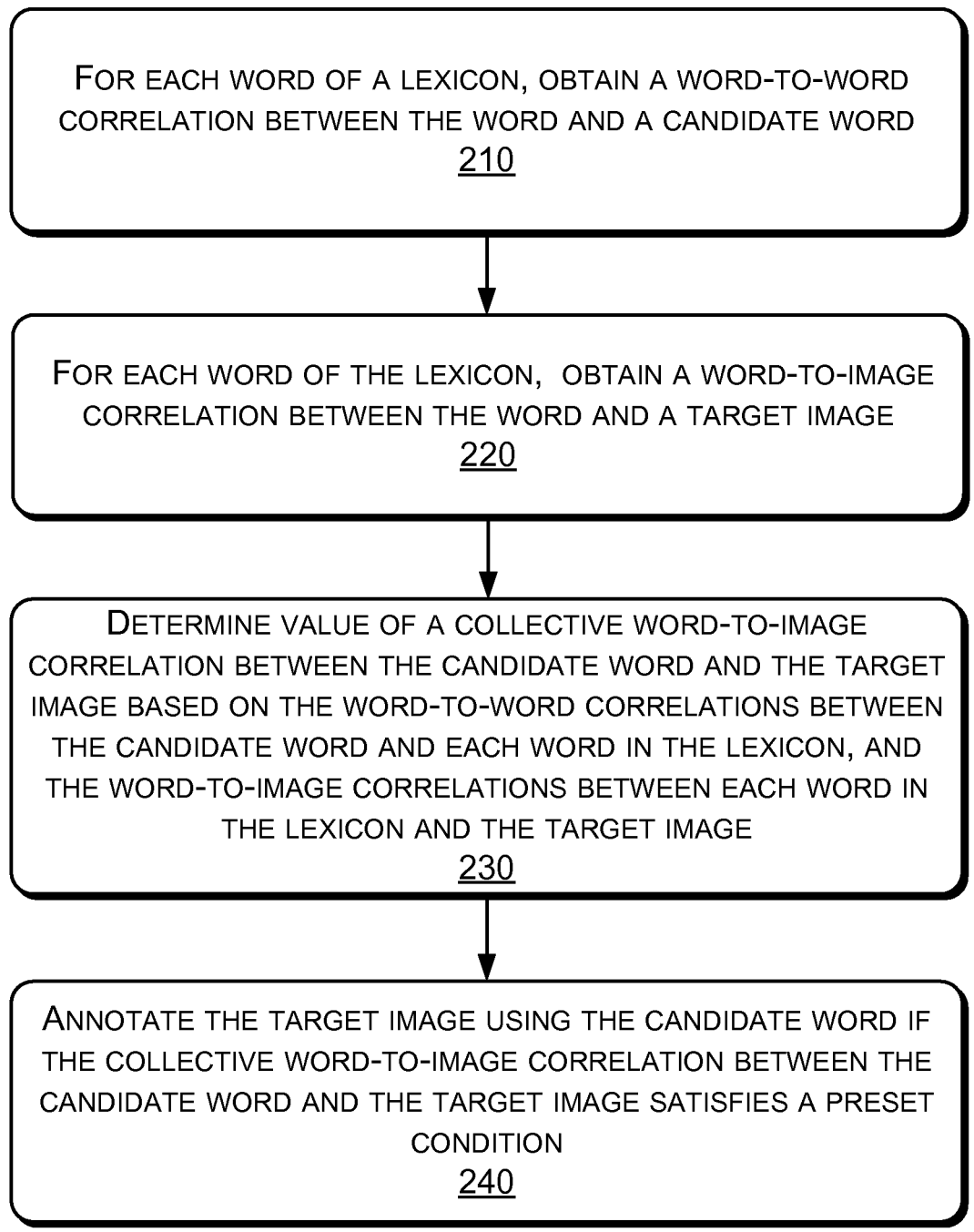
FIG. 2 shows a flow chart of another exemplary method for image annotation according to the DCMRM model.

The annotation process based on the relevance model (RM) aims to maximize the joint probability between the image being annotated and the word(s) used for annotation. Instead of estimating the joint probability by calculating the expectation over images in a training set as traditional RM does, the present disclosure describes a dual cross-media relevance model (DCMRM) for automatic image annotation, which estimates the joint probability by calculating the expectation over words in a pre-defined lexicon. The term "dual" in the name refers to the exchange on the roles of "images" and "words" between DCMRM and those traditional relevance models.

DCMRM exchanges the roles of "images" and "words" found in the traditional relevance models. This alleviates the dependence on a training image database, and may benefit from the fact that a predefined lexicon potentially has better behavior than a training image database. DCMRM also enables the integration of web search techniques into the framework of image annotation. DCMRM may still be used with a training set, but when a training set is unavailable, where traditional methods fail, DCMRM is still applicable. With the development of various search techniques, image search engines such as Windows Live, Google and Yahoo! can provide good search results. Integration of web search techniques in DCMRM takes advantages of these publicly available resources to achieve effective image annotation.

The DCMRM model mainly involves two types of relations, i.e., word-to-word relation and word-to-image relation. These relations may be quantitatively estimated or calculated as a word-to-word correlation and a word-to-image correlation, respectively. The two types of relations can be well estimated given a training set. However, when a training set is unavailable, where traditional methods fail, DCMRM is still applicable because the two types of relations can be obtained using other techniques such as search-based techniques. For this purpose, the present disclosure further introduces a set of search-based schemes to estimate both relations in DCMRM. The disclosure herein describes how to calculate the probability of an image given a certain keyword by exploring keyword-based image retrieval, in which the top-ranked images obtained by an image search engine are considered.

The disclosure also introduces two types of search-based word correlations in the web context. One type of word correlation is statistical correlation based on the counts of resulting images. The other is content-based correlation, which is estimated by analyzing the visual features such as the visual distance (or visual similarity) and the visual consistence among resulting images. The two types of word correlations may be combined in a linear form.

Upon obtaining the word-to-word relation and word-to-image relations, DCMRM integrates the relations into the proposed model and perform the image auto-annotation. Good performance of the solution based on DCMRM is demonstrated from the experiments on the Corel dataset and the web dataset.

One aspect of the present disclosure is an image annotation method based on DCMRM. Exemplary processes of the image annotation methods are described below with reference to FIGS. 1-2. The order in which the method is described is not intended to be construed as a limitation, and any number of the described method blocks may be combined in any order to implement the method, or an alternate method.

FIG. 1 shows a flow chart of an exemplary method for image annotation according to the DCMRM model.

At block 110, for each word of a lexicon, the method obtains a word-to-word correlation between the word and a candidate word for annotation, and also obtains a word-to-image correlation between the word and a target image which is being annotated. Further detail of how the word-to-word correlation and word-to-image correlation are obtained is provided in a later section of this description.

In this description, the term "lexicon" refers to a collection of words, and may or may not be a complete dictionary. For example, to each annotation, block 110 may be performed for a selection of words from a complete lexicon or dictionary, and in this case, the selection of words, rather than the complete lexicon, constitutes a "lexicon" in the context of that particular annotation. In a preferred embodiment, however, a lexicon may be predefined and blocked 110 performed for every word in the complete lexicon.

At block 120, the method determines the value of a collective word-to-image correlation between the candidate word and the target image. The value of the collective word-to-image correlation is determined based on the word-to-word correlations between the candidate word and each word in the lexicon, and the word-to-image correlations between each word in the lexicon and the target image. Further detail of how the value of the collective word-to-image correlation is determined is provided in a later section of this description.

At block 130, the method annotates the target image using the candidate word if the collective word-to-image correlation between the candidate word and the target image satisfies a preset condition. The collective word-to-image correlation may be a joint probability of the candidate word and the target image, calculated using techniques disclosed herein.

In one embodiment, the above blocks 110 and 120 are repeated for a plurality of candidate words selected from the lexicon. A collective word-to-image correlation is determined between each candidate word and the target image to give values of a plurality of collective word-to-image correlations, whereupon the method compares the values of the collective word-to-image correlations of the different candidate words and annotates the target image with at least one of the candidate words. In one embodiment, the candidate word(s) whose value of the collective word-to-image correlation is among the highest is selected to annotate the target image.

FIG. 2 shows a flow chart of another exemplary method for image annotation according to the DCMRM model.

At block 210, the method obtains a plurality of word-to-word correlations. Each word-to-word correlation is defined between a pair of words selected from a lexicon. In a preferred embodiment, the lexicon is predefined and word-to-word correlation is defined between every unique pair of words selected from the lexicon.

At block 220, the method obtains a plurality of word-to-image correlations. Each word-to-image correlation is defined between a word in the lexicon and a target image being annotated. In a preferred embodiment, the lexicon is predefined and word-to-image correlation is defined between every word in the lexicon and the target image that is being annotated.

At block 230, for a candidate word selected from lexicon, the method determines the value of a collective word-to-image correlation between the candidate word and the target image. The determination is based on the word-to-word correlations between the candidate word and each word in the lexicon, and the word-to-image correlations between each word in the lexicon and the target image.

At block 240, the method annotates the target image using the candidate word if the value of the collective word-to-image correlation between the candidate word and the target image satisfies a preset condition.

In an exemplary embodiment, block 230 is performed for a plurality of candidate words respectively. This results in a plurality of collective word-to-image correlations with different values. The method compares the values of the collective word-to-image correlations of the plurality of candidate words, and annotates the target image with at least one of the candidate words according to a preset condition. For example, the annotation method may annotate the target image with one or more candidate words whose value of the collective word-to-image correlation is among the highest of the plurality of candidate words. A higher value of the collective word-to-image correlation between a candidate word and the target image is believed to indicate a higher relevance of the candidate word to the target image.

The exemplary methods of FIGS. 1-2 based on DCMRM may use various techniques for obtaining word-to-word correlations and word-to-image correlations. Examples of such techniques, especially search-based techniques using Internet image search engines, are described below.

EXEMPLARY EMBODIMENTS

Further detail of the DCMRM model is described below, including a presentation of formal study about traditional methods and the proposed DCMRM, and implementation detail of the search-based image annotation.

A. Relevance Models for Image Annotation

Figure 3:
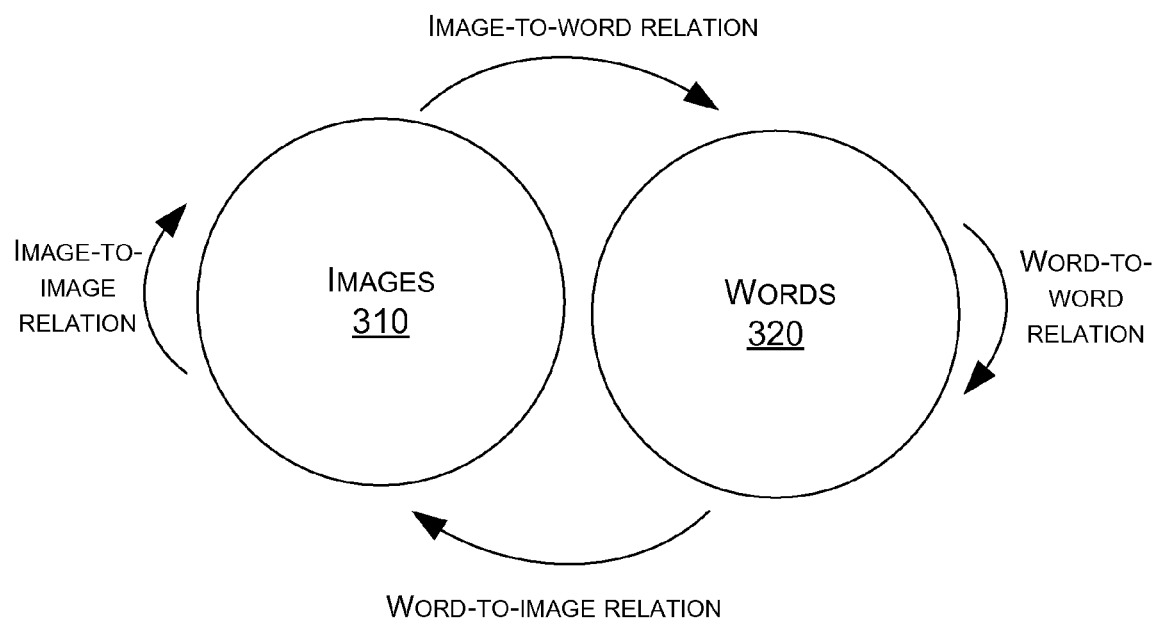
FIG. 3 shows a schematic diagram showing the various relations involved in image annotation.

FIG. 3 is a schematic diagram showing the various relations involved in image annotation. Image annotation involves two media types: image and word. As shown in FIG. 3, image annotation involves four kinds of relations between images 310 and words 320.

(a) image-to-image relation (IIR);
(b) word-to-word relation (WWR);
(c) image-to-word relation (IWR); and
(d) word-to-image relation (WIR).

The above IIR is the relation between images, which is typically built with visual content features. WWR is the relation between words, which is usually built with statistical correlation in the corpus or certain lexicon (such as Word-Net), but may also be built with the methods disclosed herein. IWR denotes the probability of a keyword given an image, which is typically built on the training set in traditional methods. WIR represents the probability of an image given certain keyword, which is similar to the goal of keyword-based image retrieval, i.e., ranking images according to their relevance to the query keyword.

Image annotation can be understood as a learning process, in which the unknown relations between test images and annotated words are estimated by exploring available resources. For this reason, how to estimate and integrate these four relations is a key issue and is a job handled by a relevance model. Traditional methods usually use relevance models that focus on IIR and IWR. In contrast, the proposed DCMRM as further discussed below uses WWR and WIR.

Figure 4:
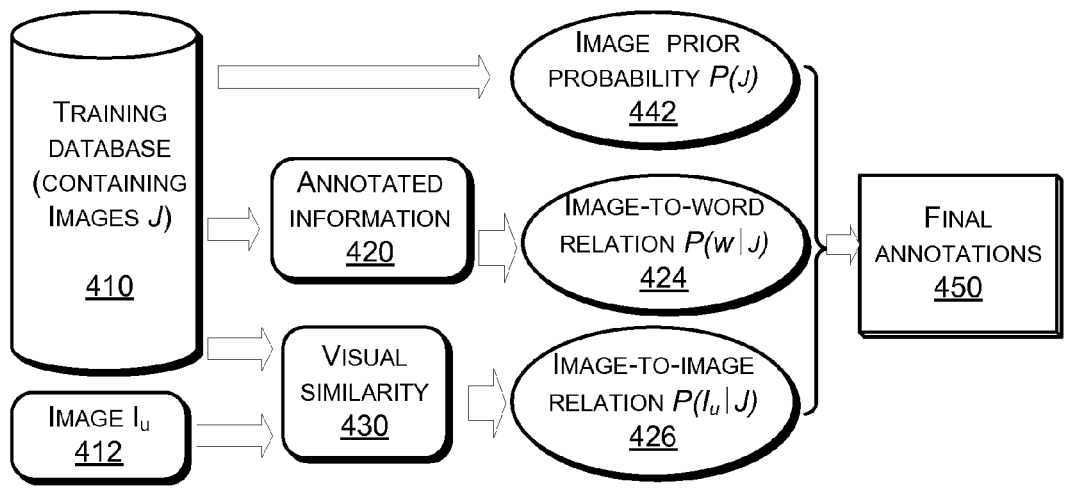
FIG. 4 shows a schematic diagram illustrating an annotation framework of traditional relevance models.

Traditional Relevance Models:

FIG. 4 is a schematic diagram illustrating an annotation framework of traditional relevance models. Image annotation methods based on traditional relevance models, such as CMRM and MBRM, have achieved encouraging performance and become a promising direction in the literature. These relevance models are used to estimate the joint distribution of words and images, which typically require a training database with high quality. The annotation framework shown in FIG. 4 uses a training database 410 having a collection of preselected images J, which are usually annotated or tagged. Image $I_u$ 412 (which is to be annotated) is trained over the training database 410 to obtain information of visual similarity 430, from which image-to-image relation $P(I_u|J)$ 426 is obtained. The annotation framework also obtains annotated information 420 from the annotated images J in training database 410. The annotated information 420 is a basis for obtaining image-to-word relation $P(Iu|J)$ 426 between each candidate word w and images J in the training database 410. Information of image prior $P(J)$ 442 is also obtained from training database 410. The annotation framework further obtains image-to-word relation $P(w|J)$ 424 and image-to-image relation $P(Iu|J)$ 426, from which final annotations 450 is obtains, as further illustrated below.

The final annotation 450 is based on a joint distribution computed as an expectation projected over training images J in the training database 410. The annotations for an untagged image $I_u$ are obtained by maximizing the expectation as:

$$W^* = \arg\max_{w \subset V}\{P(w \mid I_u)\} \quad (1)$$

$$= \arg\max_{w \subset V}\{P(w, I_u)\}$$

$$= \arg\max_{w \subset V}\left\{\sum_{J \in T} P(w, I_u \mid J) P(J)\right\}$$

where J is an image in the training set T, w is a word or a set of words in the annotation set V, and $I_u$ is the untagged image that needs to be annotated or tagged.

With the assumption that the probabilities of observing the word w and the image $I_u$ are mutually independent given an image J, the above model can be rewritten as:

$$w^* = \arg\max_{w \subset V}\left\{\sum_{J \in T} P(w \mid J) P(I_u \mid J) P(J)\right\} \quad (2)$$

where $P(w|J)$ is an IWR relation, denoting the probability of w given the training image J; $P(I_u|J)$ is an IIR relation, denoting the probability of $I_u$ given J; and $P(J)$ is the probability of selecting the image J. These three components are included in traditional relevance models, as further explained as follows:

P(J) indicates the prior distribution of an image, which is usually given a uniform prior.

$P(I_u|J)$ (IIR) represents the probability of test image ($I_u$) given training image (J), which is estimated by the visual similarity between images.

P(w|J) (IWR) models the word distribution in the training set, such as the multinomial distribution in CRM and the multiple Bernoulli distribution in MBRM.

From the view of the relation exploration, a general explanation can be attached to the models with the form as expressed in Eq. 2. The explanation is that the words with the prior confidence (IWR: P(w|J)) are propagated from training images to un-annotated images through their visual similarities (IIR: P(I|J)), while P(J) can be viewed as the weight of each training image to reflect its importance.

Dual Cross-Media Relevance Model (DCMRM):

In contrast to the traditional methods, the DCMRM model of the present disclosure proposes to compute the expectation of the joint probability of a target image $I_u$ and a candidate word over words in a lexicon V, instead of over training images. The target image $I_u$ represents the image to be annotated by one or more candidate words. The annotation of the target image $I_u$ is obtained by maximizing the expectation of the joint probability of the target image $I_u$ and the candidate word w. The annotation w* is given as:

$$w^* = \arg \max_{w \subset V} \{P(w, I_u)\} \quad (3)$$
$$= \arg \max_{w \subset V} \sum_{v \in V} P(w, I_u | v) P(v)$$

Specifically, a candidate word w which leads to a higher joint probability is more likely to be used to annotate the target image $I_u$. In one embodiment, the word w having the highest expectation (or highest joint probability) is used to annotate the target image $I_u$. However, multiple words having highest expectation values among all candid words tested may be used to annotate the target image $I_u$.

The above model uses a pre-defined lexicon (V) rather than a clean training image database. Once the lexicon is given, the model alleviates the dependence on training set, and enables much potential to image annotation. The construction of the lexicon may appeal to some developed resources, e.g. the lexicon of WordNet, besides the training dataset. In addition, studies about quantifying the "visualness" of words are also beneficial. In contrast to the content features of images, words are the most direct representation of semantics and are more manageable in terms of both the scale and the descriptors.

In one embodiment, the DCMRM model also assumes that the probability of observing the word w and the image $I_u$ are mutually independent given a word v, and accordingly the annotations are obtained by maximizing the expectation of the joint probability of the image $I_u$ and the candidate word w projected over the lexicon. The annotation is given as follows:

$$w^* = \arg \max_{w \subset V} \sum_{v \in V} P(I_u | v) P(w | v) P(v) \quad (4)$$

where $P(I_u|v)$ is a WIR relation and denotes the probability of the untagged image $I_u$ given a word v; P(w|v) is a WWR relation and denotes the probability of a word w given a word v; and P(v) is the probability of selecting a word v to generate the observations $I_u$ and w.

Comparing Eq. 3 with Eq. 1 (or Eq. 4 with Eq. 2), it is appreciated that the proposed DCMRM model exchanges the roles of the images and words as compared to the traditional relevance models discussed above. However, the proposed model is far more than a just simple exchange, as described in further detail later sections of this description.

P(v) indicates the importance (or popularity) of a word, which can be estimated by employing techniques used for textual information retrieval and some domain knowledge.

P(w|v) (WWR) represents the semantic relation between two words w and v. The methods for estimating word correlations from image search (such as Web image search) as described herein may be used for obtaining P(w|v) (WWR). However, conventional corpus-based statistics and WordNet-based word correlation may also be used. Furthermore, a combination of several different methods may be used to obtain a combined word-to-word relation P(w|v).

$P(I_u|v)$ (WIR) models how the image $I_u$ is relevant to the given word (v). This modeling is consistent with the goal of the keyword-based image retrieval. Accordingly, many existing retrieval and search techniques can be adopted for estimating this word-to-image relation $P(I_u|v)$.

The above P(v) and P(w|v) may be united to rewrite Eq. 4 as:

$$P(w, v) = P(w | v) \cdot P(v) \quad (5)$$
$$w^* = \arg \max_{w \subset V} \sum_{v \in V} P(I_u | v) P(w, v) \quad (6)$$

where P(w, v) can be interpreted as the weighted-WWR, while P(v) is the weight of word pairs.

With these components, a concise interpretation of the proposed model may be derived. $P(I_u|v)$ (WIR) is the prior confidence on the correlation between the untagged image $I_u$ and each word v in the lexicon V. Based on the prior confidence, the annotation expansion and refinement are realized by exploring the weighted WWR P(w, v).

Figure 5:
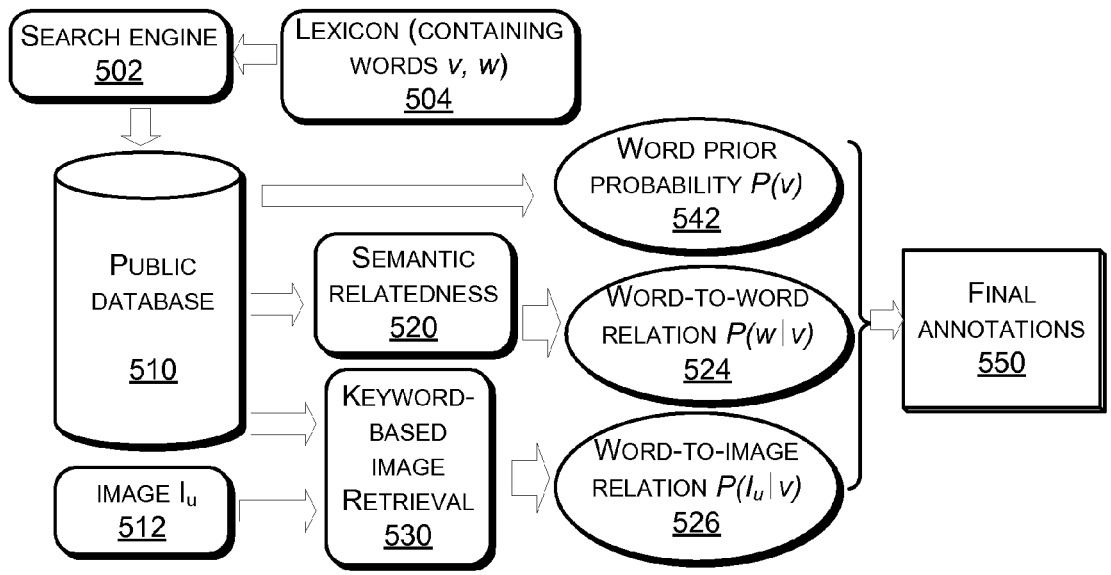
FIG. 5 shows a schematic diagram illustrating an exemplary annotation framework based on the DCMRM model.

FIG. 5 is a schematic diagram illustrating an exemplary annotation framework based on the disclosed Dual Cross-Media Relevance Model (DCMRM). The annotation framework shown in FIG. 5 uses an image search engine 502 to search a public database 510. This is different from the traditional method of FIG. 4 which uses a predefined training database 410 of a collection of preselected images. The image search engine 502 may be any image search engine available for searching images over a network. Examples of the image search engine include public search engines such as Windows Live, Google, and Yahoo. The preferred public database 510 for images is the Internet.

For each word v in lexicon V 504, a search is performed by search engine 502 using the word v as a keyword (search query) to search the public database 510. The search obtains an image set 530 as a result of keyword-based image retrieval. In one embodiment, the image set 530 includes the top images in the return of the search. The image set 530 is treated as a representation of the corresponding word v and is used for obtaining word-to-image relation $P(I_u/v)$ between the word v and the image $I_u$ 512 to be annotated. As will be further described below, searches may also be conducted using pairs of words w and v to obtain information of semantic relatedness 520, which is in turn used to obtain word-to-word relation P(w|v) 524 between the words w and v. Word prior P(v) for each word v in the lexicon V may also be obtained from public database 510. From the above information, final annotations 550 are obtained using the above Eq. 4 or Eq. 6.

A comparison between the above-discussed two frameworks (FIG. 4 and FIG. 5) is given below to demonstrate the potential benefits of the DCMRM model. Comparison of conventional methods and DCMRM First, image prior probability P(J) 442 in the conventional model may be considered to correspond to word prior probability P(v) 542 in DCMRM, because both of them belong to the estimation of a prior distribution. Due to the complex image space with large scale, it is hard to estimate the prior probability P(J) (442) of an image. Therefore, usually a uniform distribution is assumed for P(J). This is a compromise made when no better solution was available. In comparison, prior probability P(w) (542) of a word can be better estimated. This is because the scale of a common lexicon is quite small and the distribution of words is relatively simple. Furthermore, a word directly reflects the semantics, and can be easily understood by human. As a result, many textual resources and a great deal of experiential knowledge can be used to estimate the prior distribution of a word.

Second, image-to-word relation P(w|J) 424 in the conventional model may be considered to correspond to word-to-image relation $P(I_u|v)$ 526 in DCMRM, because both aim to build a correspondence between an image and a word. Especially, P(w|J) is a mapping from the image J to the word w, while $P(I_u|v)$ is a mapping from the word v to the image $I_u$. In traditional approaches, P(w|J) is typically estimated by the statistical distribution of words on the training set. The performance of traditional approaches deeply depends on the quality of the training set, and the scalability is poor. Even if a large and well-annotated dataset is given, this direct mapping still suffers from the semantic gap. In contrast, $P(I_u|v)$ can be estimated using, for example, keyword-based image retrieval as described herein. Due to the rapid development on web image search, quality indexing of images can usually be obtained and the indexing results provide beneficial information to build this word-to-image relation. For example, a public Web search engine may be used to estimate the relevance of images given a query (keyword) to alleviate the semantic gap as well as the dependence on the training set.

Third, image-to-image relation $P(I_u|J)$ 426 in the conventional models may be considered to correspond to word-to-word relation P(w|v) 524 in DCMRM, as both are pair-wise relations between two instances from the same type of media. In comparison, $P(I_u|J)$ is the image-based similarity, while P(w|v) is the word-based similarity. $P(I_u|J)$ is typically built with the content features of images. The similarities of different image-pairs usually attribute to different objects in images and are also reflected on different types of features, e.g. color, texture or shape. Thus the quality of the image-based similarity suffers from the difficulties in quantitatively understanding and analyzing images. In contrast, P(w|v) (WWR) can be estimated more effectively due to multiple reasons. First, unlike the number of images which is essentially infinite, the number of common words is essentially finite. Second, the meaning of a word is relatively limited and fixed, while the expression of an image is rich and diverse. Third, many well-developed techniques in the textual information retrieval and the natural language processing can be applied to estimate P(w|v) (WWR) of words. Fourth, advanced image search-based techniques as described herein may be used for estimating P(w|v) (WWR).

Finally, although both frameworks are based on a relevance model, their estimating processes are different in essence. The traditional model is regarded as a process of the label propagation. It aims at propagating semantics from training images to test images according to their visual similarities. In the process, while what is originally desire is semantic relatedness between images, a content-based similarity $P(I_u|J)$ between the images is actually computed using content features. This substitution clauses the label propagation to suffer from a semantic gap. In contrast, the DCMRM model is regarded as a process of the annotation expansion and refinement by exploring the word correlation, which is directly built on the semantic relevance. Thus the process is more judicious and effective.

The proposed DCMRM relevance model has a great potential to relieve the dependence on the training database and alleviate the semantic gap to some extent. Similar to other models, DCMRM can benefit from a clean training set. But in case where a training set is unavailable, DCMRM may have an advantage by enabling web search techniques to estimate the required information. As it is known, the web represents the largest publicly available corpus with aggregate statistical and indexing information. The enormous contents constitute valuable web resources that can be advantageously used by the proposed DCMRM relevance model. A search-based embodiment of DCMRM is described in the following section.

B. Search-Based Image Annotation

As described above, WWR and WIR are two important components in the proposed DCMRM relevance model. Details of the estimation of both relations are described further below, including methods for estimating WIR by using a web image searcher, and methods for estimating two types of search-based WWRs in the web context given a lexicon.

Search-Based Word-to-Image Relation (WIR):

In one embodiment, the DCMRM relevance model uses a search-based method to obtain the word-to-image relation (WIR), enabling keyword-based image search to be applicable for image annotation. With this embodiment, image annotation benefits from the encouraging performance of the web search engines. Accordingly, the scalability of the model also becomes achievable. The following details the method to calculate the word-to-image relation, i.e., $P(I_u|v)$, by using an image search engine.

Figure 6:
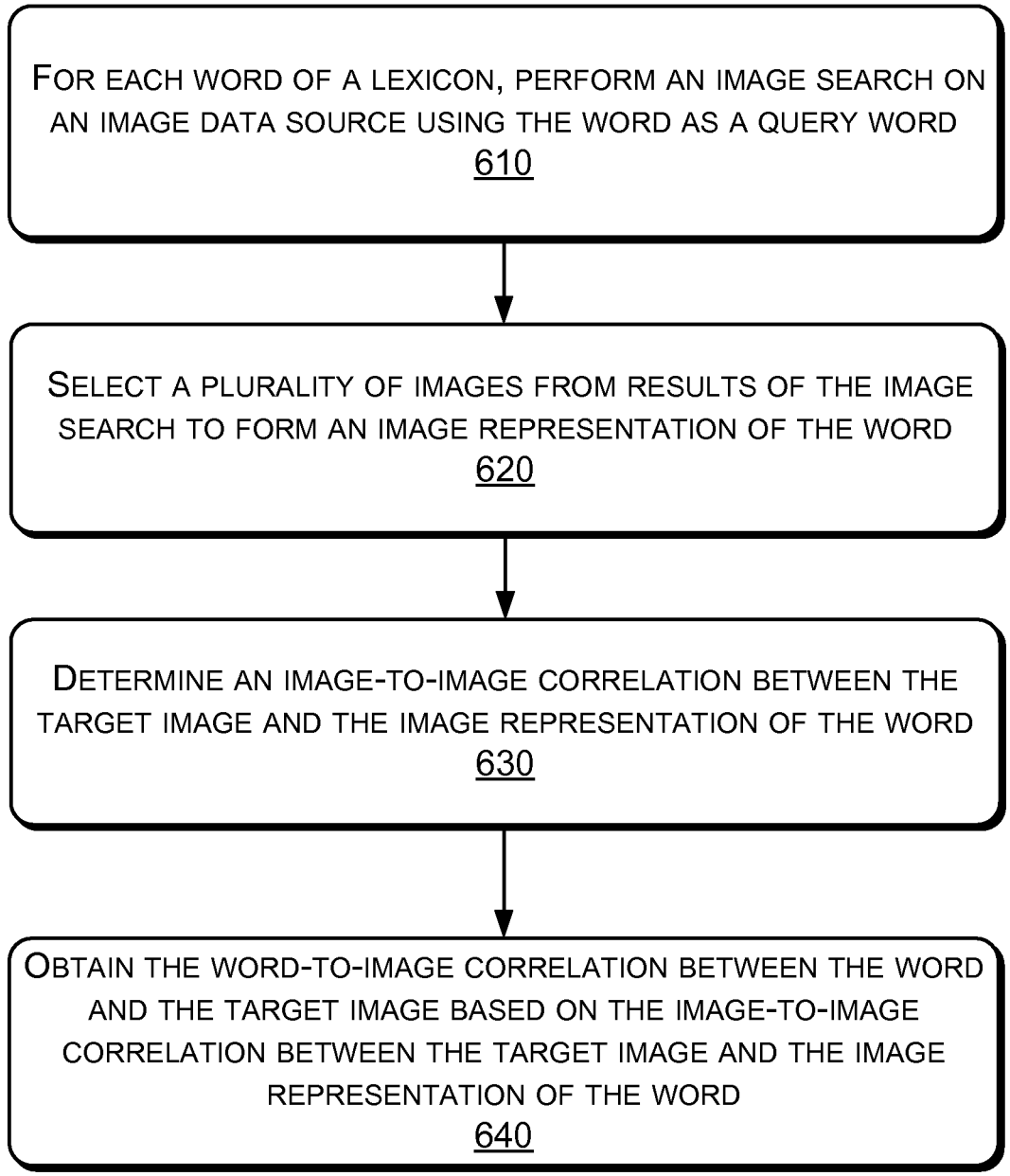
FIG. 6 shows a flowchart of an exemplary method for obtaining the word-to-image correlation between each word in a lexicon and a target image to be annotated.

FIG. 6 is a flowchart of an exemplary method for obtaining the word-to-image correlation between each word in a lexicon and a target image to be annotated.

At block 610, the method performs an image search on an image data source using the word as a query word. The image data source may be the Internet.

At block 620, the method selects images from results of the image search to form an image representation of the word. Preferably, the images are selected from the top-ranked images in the result of the image search.

At block 630, the method determines an image-to-image correlation between the target image and the image representation of the word.

At block 640, the method obtains the word-to-image correlation between the word and the target image based on the image-to-image correlation between the target image and the image representation of the word.

Given a keyword query, a web image search engine, e.g. Google image searcher, usually returns good search results, especially those on the first page. Accordingly, top-ranked images can be roughly treated as the visual representation of the query. The similarity between the untagged image and the resulting images may be used to represent the relation between the untagged image and the query word.

Generally, a search engine gives its attention to the relevance and the diversity of resulting images simultaneously. For example, with a submitted query word "jaguar", images about an animal, a car or a plane may appear in the resulting set. That is, returned images usually are diverse on semantic meanings and visual appearances. Therefore even if only partial resulting images are visually similar to a target image, it may be inferred that the target image can be reasonably annotated by the query word. Based on this consideration, larger weights may be assigned to the images which are more similar to the target image. In other words, the model rewards for the images that are similar to the target image, but applies a penalty for the images that are dissimilar. An exemplary calculation of image-based similarity is given as follows:

$$S(I_u, R_v) = \sum_{r_i \in R_v} \alpha_i S_{IIR}(I_u, r_i) \qquad (7)$$
$$= \sum_{r_i \in R_v} \alpha_i \exp\left(-\frac{d(f_u, f_{r_i})}{\sigma}\right)$$

where v is a query word; $S_{IIR}(I_u, r_i)$ is the similarity between the target image ($I_u$) and an image $r_i$ in the resulting image set $R_v$ (e.g., experientially including top-ranked 20 images); $\alpha_i$ is a adjustable parameter, which aims to support similar image-pairs and penalize dissimilar image-pairs; and d(.) is certain distance metric between feature vectors $f_u$ and $f_{r_i}$, which in one embodiment is $L_1$-distance.

Usually, all the top-ranked images can be crawled when the lexicon is given. Both the image crawling and feature extraction can be done a prior once and for ever. To annotate a target image, only the final calculation of image similarity, such as that expressed in Eq. 7, needs to be conducted. The online computation is thus not expensive.

In certain situations, the target image itself may be an image extracted from a web page. In this case, the target image may be accompanied by some textual information, such as a text characterizing the image. Examples of such characterizing text include a title, URL, and surrounding text. The characterizing text can also be utilized to measure the relation between the image and certain word in a lexicon. An exemplary embodiment adapts a simple manner to calculate the semantic relatedness as follows:

$$S(W_u, v) = \sum_{w_i \in W_u} \beta_i S_{WWR}(w_i, v) \qquad (8)$$

where $W_u$ is a set of words representing the textual information accompanying the target image $I_u$; $\beta_i$ is a weight positively relevant to the term frequency-inverse document frequency (tf-idf value) of $w_i$; and $S_{WWR}(w_i,v)$ is the correlation between words $w_i$ and v, which will be discussed in a subsequent section herein.

In the above scenario where the target image is associated with a characterizing text, the DCMRM model determines a word-to-word correlation between the word and the characterizing text of the target image in order to obtain the word-to-image correlation between the word and the target image. The method may then determine a word-to-image correlation between the word and the target image at least partially based on the word-to-word correlation between the word and the characterizing text.

The final word-to-image relation can be determined using either the image-to-image correlation method according to Eq. 7 or the semantic relatedness according to Eq. 8. In one embodiment, the final word-to-image relation is determined by integrating both measures, given as:

$$S_{WIR}(I_u,v)=[S(I_u,R_v)]^{\eta_1} \cdot [S(W_u,v)]^{\eta_2} \qquad (9)$$

where $\eta_1, \eta_2 \geq 0$ are parameters to control the reliabilities of the above two measures, respectively. Specially, if there is no textual information for $I_u$, $\eta_2=0$ and the final word-to-image correlation is determined solely using the image-to-image correlation method according to Eq. 7.

Search-Based Word-to-Word Correlation:

In one embodiment, the DCMRM relevance model uses a search-based method to obtain the word-to-word relation (WWR), further enabling keyword-based image search to be applicable for image annotation. Details of the search-based methods to calculate the word-to-word relation P(w|v) are disclosed in the commonly-owned U.S. patent application Ser. No. 11/956,333, entitled "Estimating Word Correlations from Images", filed on Dec. 13, 2007 with the present patent application.

For example, to obtain the word-to-word correlation between a word in the lexicon and a candidate word for annotation, the DCMRM relevance model may obtain an image representation of the word and an image representation of the candidate word, and determining the word-to-word correlation based on the visual features of the image representations. For instance, a visual distance or a visual similarity between the image representation of the word and the image representation of the candidate word may be calculated for such purpose. The image representations may be obtained by conducting an image search using the respective word as the keyword. The top-ranked images in the search result may be used to construct an image representation of the word. Alternatively, a conjunctive image representation of a word in the lexicon and a candidate word for annotation may be obtained by conducting an image search using the word and the candidate word together as a conjunctive search word. The word-to-word correlation between the word and the candidate word may be determined at least partially based on visual features of the conjunctive image representation of the word and the candidate word. One example of the visual features of the conjunctive image representation is a visual consistence of the multiple images in the conjunctive image representation.

The word-to-word correlation between each word and the candidate word may also be obtained using a linear combination of two or more different methods. For example, the DCMRM model may first determine two separate word-to-word correlations between a word in lexicon and a candidate word using two different techniques, and obtain a final word-to-word correlation by linearly combining the two word-to-word correlations. For instance, the first correlation may be based on individual image representations of each word, and second based on a conjunctive image representation of both words. In another example, the first correlation may be based on visual features of image representations of the words, and the second correlation obtained by a text-based method.

Within DCMRM, the word-to-word correlations are primarily used in Eqs. 4-6 to evaluate each candidate word. However, the word-to-word correlation may also be used to refine and expand candidate annotations obtained from the above WIR indeed. For example, word-to-word correlations may be determined among multiple candidate words selected by using Eqs. 4-6 for further refinement of the final words for annotation. Word-to-word correlations may also be determined among other words and candidate words that are already selected to expand the candidate annotations. A well-defined word-to-word correlation enhances the performance of image annotation.

The calculation of word-to-word correlation may be done with assistance of a web search engine. The calculation may be based on either statistical correlation within the web context or content-based correlation obtained from resulting images of an image searcher such as Google image searcher. Since image is the focus of image annotation, visual content as a direct representation of image is a useful contribution to the word correlation. For this reason, the content-based word-to-word correlation may give more robust results.

In one embodiment, the word-to-word correlation is estimated based on visual distance of an image search result. Given a keyword query, image search engines such as Live Search, Google, or Yahoo! usually return good searching results, especially those images on the first page. Thus, top-ranked images as collective image sets can be roughly treated as a visual representation of the respective query word. The visual similarity between two resulting image sets can be then used to represent the relation between corresponding query words. The visual similarity can be quantitatively calculated based on the visual features of the image set.

In one embodiment, each image has multiple image features represented by a vector, and each image set forms of vector set. The disclosed techniques adopt a simple strategy to calculate the visual similarity between both vector sets. The visual-based word correlation is given as follows:

$$K_{VC}(x, y) = S_I(I(x), I(y)) \quad (12)$$
$$= \sum_{m,n} S(I_m(x), I_n(y))$$

where $K_{VC}(x,y)$ indicates the visual-based word correlation between words x and y; $I(x)$ and $I(y)$ indicate the resulting image sets by the word x and y respectively; $I_m(x)$ is the $m^{th}$ image in the image set $I(x)$; $S_I(.)$ is the similarity between both sets; and $S(.)$ is the similarity between two images, and m, n=1,2, . . . , M, where M is the number of top images from the resulting images.

In another embodiment, the word-to-word correlations are estimated based on visual consistence of an image search result. When two words with the conjunctive operator (AND) are submitted as one query, the returned images are those indexed by both words. The returned images may be considered as a conjunctive image representation of the two words submitted with the conjunctive operator (AND). If the words are not semantically related to each other, they are unlikely to be associated with the same images or visually similar images together. Accordingly, the search results may be very noisy and not visually consistent. Based on this consideration, the visual consistence of the search results is believed to be a good indicator of the correlation between words. In one embodiment, the disclosed techniques use the variances of visual features to describe the visual consistence. Generally, less variance of visual features corresponds to greater consistence on the visual appearance, and vice versa.

With multimodal image features extracted, it is preferred that some image features are given more weight than others in calculating the visual variance in order to better imitate actual human visual cognition. From studies of cognitive psychology, it is learned that human infers overall similarity based on the aspects that are similar among the compared objects, rather than based on the dissimilar ones. Accordingly, in one embodiment, a new measure called Dynamic Partial Variance (DPV), which focuses on the features with low variances and activates different features for different image sets, is introduced as described below.

Assuming the variances of each dimensional feature among images in set S are ordered as $var_1(S) \leq var_2(S) \leq \ldots \leq var_d(S)$, the DPV is defined as:

$$DPV(S) = \frac{1}{l} \sum_{i=1}^{l<d} var_i(S) \quad (13)$$

where d is the total dimension for various visual features, and l is the number of similar aspects activated in the measure. This allows a subset of image features to be selected from all image features extracted from the image set, and a selective partial variance of the subset of image features to be calculated. The subset of image features includes image features having relatively low variance. A threshold may be set for the purpose of making the cut among the image features. The subset of image features may be selected dynamically as the conjunctive image representation varies. That is, the image features that make the cut to be selected into the subset for calculating DPV may be different for different image representations. Furthermore, l the number of similar aspects activated in the measure might also vary from one image representation to another.

To ensure that the DPVs of the resulting images given a word-pair query are comparable to each other, these values are normalized according to the semantic uniqueness of the single word, i.e., the DPV of the resulting images given a single-word query. The normalized correlation between word x and word y is given as:

$$K_{CC}(x, y) = \exp\left(-\sigma_2 \cdot \frac{DPV(S_{xy})}{\min\{DPV(S_x), SPV(S_y)\}}\right) \quad (14)$$

where $\sigma 2 > 0$ is a smoothing parameter.

Combined Word-To-Word Correlation

The above-described content-based methods for estimating word correlations may be used either separately or in combination. For example, the two types of word correlations described above with different characteristics may be combined to calculate a combined word correlation.

To make different correlations complement each other, an exemplary embodiment proposes to unify all work relations in a linear form after they are normalized into [0, 1]. Better performance is expected when more sophisticated combinations are used. An exemplary linear combination is given as:

$$S_{WWR} = \epsilon K_{SCS} + (1-\epsilon) K_{CCS} \quad (15)$$

where $0 < \epsilon < 1$, and experientially $\epsilon = 0.5$ in an exemplary implementation.

Furthermore, either or both of the above content-based methods may be further combined with an alternative method, such as a text-based method for estimating word correlations, to estimate a more balanced word-to-word correlation using a formula similar to the above Eq. (15).

Implementation Environment

The above-described method may be implemented with the help of a computing device, such as a server, a personal computer (PC) or a portable device having a computing unit.

Figure 7:
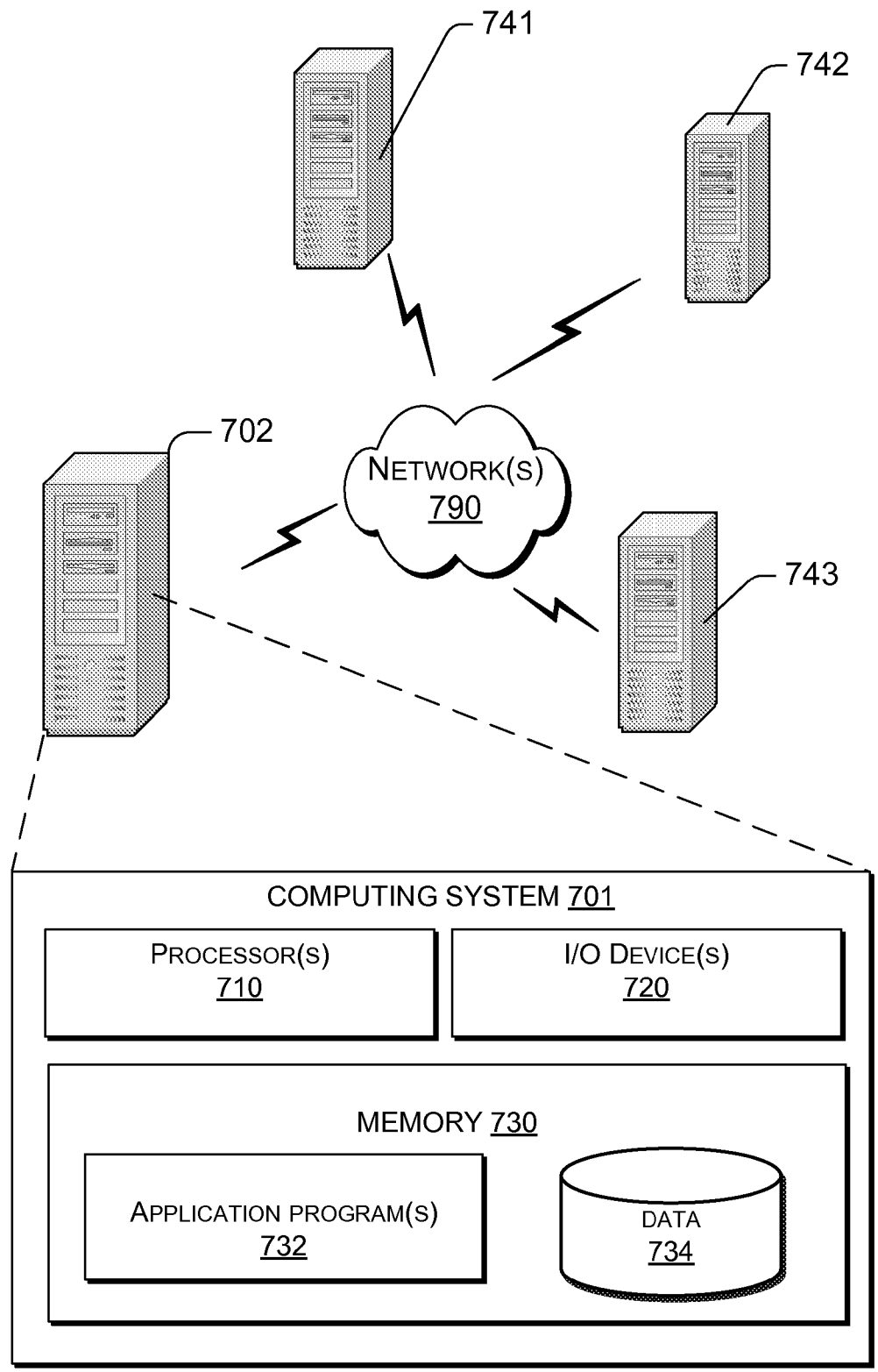
FIG. 7 shows an exemplary environment for implementing the method based on the DCMRM model.

FIG. 7 shows an exemplary environment for implementing the method of the present disclosure. Computing system 701 is implemented with computing device 702 which includes processor(s) 710, I/O devices 720, computer readable media (e.g., memory) 730, and network interface (not shown). The computer readable media 730 stores application program modules 732 and data 734 (such as word-to-word correlation data and word-to-image correlation data). Application program modules 732 contain instructions which, when executed by processor(s) 710, cause the processor(s) 710 to perform actions of a process described herein (e.g., the processes of FIGS. 1-2 and 5-6).

For example, in one embodiment, computer readable medium 730 has stored thereupon a plurality of instructions that, when executed by one or more processors 710, causes the processor(s) 710 to:

(a) obtain a plurality of word-to-word correlations, where each word-to-word correlation is defined between a pair of words selected from a lexicon;

(b) obtain a plurality of word-to-image correlations, where each word-to-image correlation is defined between a word in the lexicon and a target image;

(c) for a candidate word selected from lexicon, determine value of a collective word-to-image correlation between the candidate word and the target image based on the word-to-word correlations between each word in the lexicon and the candidate word, and the word-to-image correlations between each word in the lexicon and the target image; and (d) annotate the target image using the candidate word if the collective word-to-image correlation between the candidate word and the target image satisfies a preset condition.

In one embodiment, the processor(s) 710 provides image representations of words by conducting image searches via network(s) 790 to retrieve images from multiple data sources such as servers 741, 742 and 743.

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing device may be any device that has a processor, an I/O device and a memory (either an internal memory or an external memory), and is not limited to a personal computer. For example, a computer device may be, without limitation, a server, a PC, a game console, a set top box, and a computing unit built in another electronic device such as a television, a display, a printer or a digital camera.

CONCLUSION

The present disclosure describes a unique annotation framework referred to as the dual cross-media relevance model (DCMRM). The proposed DCMRM provides a new direction to image auto-annotation. The method is unique in that it may be adapted to formally integrate the word relation, image retrieval, and web search techniques together to achieve effective image annotation.

In contrast to traditional relevance models which compute the joint probability as an expectation projected over training images, DCMRM calculates the expectation over words in a pre-defined lexicon. This duality of images and words enables much potential in image annotation. The public search engines and their well-developed indexing may be used to obtain the important components in the DCMRM relevance model. The proposed model uses search-based WIR and the combined WWR within the web context to perform image annotation. As a result, the dependence on the training dataset, which is necessary to most traditional methods, is relieved by using web search techniques in DCMRM. DCMRM is potentially applicable for web image annotation with no labeling information initially provided in the web dataset, a situation in which other models may be unfeasible.

The proposed DCMRM relevance model is evaluated in two different situations. The first is done on a high-quality training set, e.g., the standard Corel dataset. This experiment demonstrates that the proposed framework can potentially obtain better results when the good training information is available. The other is based on a web dataset without any manual label information. This experiment demonstrates that the framework is applicable without any training knowledge and also achieves promising performance.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
for each word v of a lexicon V:
obtaining a word-to-word correlation between a candidate word w and each word v in the lexicon V measured by P(w|v) which comprises a conditional probability of the candidate word w given the word v; and
obtaining a word-to-image correlation between the word v and a target image $I_u$ independently of a training set of images, based at least on an image representation of the word v that is developed through an analysis of one or more top ranked images obtained by an image search engine searching on the word v, the word-to-image correlation between each word v in the lexicon V and the target image $I_u$ measured by $P(I_u|v)$ which comprises a conditional probability of the target image $I_u$ given the word v;
determining a value of a collective word-to-image correlation between the candidate word w and the target image $I_u$ based on the word-to-word correlations between the candidate word w and each word v in the lexicon V and the word-to-image correlations between each word v in the lexicon V and the target image $I_u$; and
annotating the target image $I_u$ using the candidate word w if the collective word-to-image correlation between the candidate word w and the target image $I_u$ satisfies a preset condition, the value of the collective word-to-image correlation between the candidate word w and the target image $I_u$ calculated using:

$$w^* = \arg\max_{w \subset V} \sum_{v \in V} P(I_u | v) P(w | v) P(v),$$

wherein P(v) is a measure of at least one of an importance or a popularity of the word v in the lexicon V.

2. The method as recited in claim 1, wherein obtaining the word-to-word correlation between the word v and the candidate word w and determining the value of the collective word-to-image correlation between the candidate word w and the target image $I_u$ are repeated for a plurality of candidate words selected from the lexicon V, and wherein annotating the target image $I_u$ comprises:

comparing the values of the collective word-to-image correlations of the plurality of candidate words; and annotating the target image $I_u$ with at least one of the candidate words whose value of the collective word-to-image correlation is among the highest of the plurality of candidate words.

3. The method as recited in claim 1, wherein annotating the target image $I_u$ comprises:

calculating the value of the collective word-to-image correlation between the candidate word w and the target image using the following formula:

$$w^* = \arg\max_{w \subset V} \{P(w, I_u)\}$$
$$= \arg\max_{w \subset V} \sum_{v \in V} P(w, I_u | v) P(v),$$

wherein P(v) is a measure of importance or popularity of each word v in the lexicon V, and $P(w, I_u|v)$ is a joint probability of the candidate word w and the target image $I_u$ given the word v.

4. The method as recited in claim 1, wherein obtaining the word-to-image correlation between each word v and the target image $I_u$ comprises:

performing an image search on an image data source using the word v as a query word;

selecting a plurality of images from results of the image search to form the image representation of the word v;

determining an image-to-image correlation between the target image $I_u$ and the image representation of the word v; and obtaining the word-to-image correlation between the word v and the target image $I_u$ based on the image-to-image correlation between the target image $I_u$ and the image representation of the word v, wherein the word-to-image correlation is the conditional probability of the target image $I_u$ given the word v.

5. The method as recited in claim 1, wherein the target image $I_u$ is associated with a characterizing text, and obtaining the word-to-image correlation between each word v and the target image $I_u$ comprises:

determining a word-to-word correlation between the word v and the characterizing text; and determining the word-to-image correlation between the word v and the target image $I_u$ based on the word-to-word correlation between the word v and the characterizing text.

6. The method as recited in claim 1, wherein obtaining the word-to-word correlation between each word v and the candidate word w comprises:

calculating a visual distance or a visual similarity between the image representation of the word v and an image representation of the candidate word w.

7. The method as recited in claim 1, wherein obtaining the word-to-word correlation between each word v and the candidate word w comprises:

providing the image representation of the word v and an image representation of the candidate word w; and determining the word-to-word correlation between the word v and the candidate word w at least partially based on visual features of the image representations of the word and the candidate word w.

8. The method as recited in claim 7, wherein providing the image representation of each word v comprises:

conducting an image search using the word v as a query word; and selecting a plurality of images from search results associated with the query word.

9. The method as recited in claim 7, wherein providing the image representation of the candidate word w comprises:

conducting an image search using the candidate word w as a query word; and selecting a plurality of images from search results associated with the query word.

10. The method as recited in claim 1, wherein obtaining the word-to-word correlation between each word v and the candidate word w comprises:

providing a conjunctive image representation of the word v and the candidate word w; and determining the word-to-word correlation between the word v and the candidate word w at least partially based on visual features of the conjunctive image representation of the word v and the candidate word w.

11. The method as recited in claim 1, wherein obtaining the word-to-word correlation between each word v and the candidate word w comprises:

calculating a first correlation between the word v and the candidate word w based on visual features of the image representation of the word v and an image representation of the candidate word w;

calculating a second correlation between the word v and the candidate word w using an alternative method that is at least one of a text-based method or a conjunctive image representation method; and determining the word-to-word correlation between the word v and the candidate word w by combining the first correlation and the second correlation.

12. A method performed by a computing device for image annotation, the method comprising:

obtaining a plurality of word-to-word correlations, each word-to-word correlation being defined between a pair of words selected from a lexicon V, each word-to-word correlation between a candidate word w and each word v in the lexicon V measured by P(w|v) which comprises a conditional probability of the word w given the word v;

obtaining a plurality of word-to-image correlations independently of a training set of images, each word-to-image correlation being defined between the word v in the lexicon V and a target image $I_u$ being annotated, each word-to-image correlation between each word v and the target image $I_u$ measured by $P(I_u|v)$ which comprises a conditional probability of the target image $I_u$ given the word v;

for a candidate word w selected from the lexicon V, determining value of a collective word-to-image correlation between the candidate word w and the target image $I_u$ based on the word-to-word correlations between the candidate word w and each word v in the lexicon V, and the word-to-image correlations between each word v in the lexicon V and the target image $I_u$, wherein the collective word-to-image correlation is a probability of the target image $I_u$ given the candidate word w; and annotating the target image $I_u$ using the candidate word w if the value of the collective word-to-image correlation between the candidate word w and the target image $I_u$ satisfies a preset condition.

13. The method as recited in claim 12, wherein determining a value of a collective word-to-image correlation between the candidate word w and the target image $I_u$ is performed for a plurality of candidate words respectively, and annotating the target image $I_u$ comprises:

comparing the values of the collective word-to-image correlations of the plurality of candidate words; and annotating the target image $I_u$ with at least one of the candidate words whose value of the collective word-to-image correlation is among the highest of the plurality of candidate words.

14. The method as recited in claim 12, wherein obtaining the word-to-image correlation between each word v and the target image $I_u$ comprises:

performing an image search on an image data source using the word v as a query word;

selecting a plurality of images from results of the image search to form an image representation of the word v;

determining an image-to-image correlation between the target image $I_u$ and the image representation of the word v; and determining the word-to-image correlation between the word v and the target image $I_u$ based on the image-to-image correlation between the target image $I_u$ and the image representation of the word v.

15. The method as recited in claim 12, wherein obtaining the word-to-word correlation between each pair of words comprises:

calculating a visual distance or a visual similarity between an image representation of first word of the pair and an image representation of second word of the pair.

16. The method as recited in claim 12, wherein obtaining the word-to-word correlation between each pair of words comprises:

providing a conjunctive image representation of the pair of words; and determining the word-to-word correlation between the pair of words at least partially based on visual features of the conjunctive image representation of the pair of words.

17. The method as recited in claim 12, wherein obtaining the word-to-word correlation between each pair of words comprises:

for each of the pair of words, conducting an image search on an image data source using the word as a query word, and selecting a plurality of images from search results to form an image representation of the word; and determining the word-to-word correlation between each pair of words based on an image-to-image correlation between the image representations of the pair of words.

18. One or more computer readable memory devices having stored thereupon a plurality of instructions that, when executed by a processor, causes the processor to:

obtain a plurality of word-to-word correlations, each word-to-word correlation being defined between a pair of words selected from a lexicon V, each word-to-word correlation between a candidate word w and each word v in the lexicon V measured by $P(w|v)$ which comprises a conditional probability of the word w given the word v;

obtain a plurality of word-to-image correlations, each word-to-image correlation being defined between a word v in the lexicon V and the target image $I_u$ being annotated, based at least on an image representation of the word v, each word-to-image correlation between each word v and the target image $I_u$ measured by $P(I_u|v)$ which comprises a conditional probability of the target image $I_u$ given the word v;

for the candidate word w selected from lexicon V, determine a value of a collective word-to-image correlation between the candidate word w and the target image $I_u$ based on the word-to-word correlations between each word v in the lexicon V and the candidate word w, and the word-to-image correlations between each word v in the lexicon V and the target image $I_u$, wherein the collective word-to-image correlation is a probability of the target image $I_u$ given the candidate word w; and annotate the target image $I_u$ using the candidate word w if the collective word-to-image correlation between the candidate word w and the target image $I_u$ satisfies a preset condition.

19. The one or more computer readable memory devices as recited in claim 18, wherein:

for a candidate word w selected from the lexicon V, determining the value of the collective word-to-image correlation between the candidate word w and the target image $I_u$ is performed for a plurality of candidate words, and annotating the target image $I_u$ comprises:

comparing the values of the collective word-to-image correlations of the plurality of candidate words; and annotating the target image $I_u$ with at least one of the candidate words whose value of the collective word-to-image correlation is among the highest of the plurality of candidate words.

20. The one or more computer readable memory devices as recited in claim 18, wherein obtaining the word-to-image correlation between each word and the target image $I_u$ comprises:

performing an image search on an image data source using the word v as a query word;

selecting a plurality of images from results of the image search to form an image representation of the word v;

determining an image-to-image correlation between the target image $I_u$ and the image representation of the word v; and determining the word-to-image correlation between the word and the target image $I_u$ based on the image-to-image correlation between the target image $I_u$ and the image representation of the word v.

\* \* \* \* \*